United States Patent
Kobayashi et al.

(10) Patent No.: US 6,876,121 B2
(45) Date of Patent: Apr. 5, 2005

(54) FLAT OSCILLATION MOTOR EQUIPPED WITH A BRUSH APPARATUS

(75) Inventors: Hajime Kobayashi, Isesaki (JP); Tetsushi Yashima, Isesaki (JP); Katsuhito Sohara, Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 10/197,430

(22) Filed: Jul. 18, 2002

(65) Prior Publication Data

US 2003/0015934 A1 Jan. 23, 2003

(30) Foreign Application Priority Data

Jul. 18, 2001 (JP) ........................................ 2001-217553

(51) Int. Cl.[7] .................................................. H02K 13/00
(52) U.S. Cl. .................... 310/252; 310/248; 310/239
(58) Field of Search .............................. 29/826; 310/81, 310/128, 135, 234–249, 251, 252

(56) References Cited

U.S. PATENT DOCUMENTS

| | | | | |
|---|---|---|---|---|
| 4,037,125 A | * | 7/1977 | Aoki ............................ | 310/248 |
| 4,323,805 A | * | 4/1982 | Caby et al. .................. | 310/237 |
| 4,758,757 A | * | 7/1988 | Okumura ..................... | 310/244 |
| 4,843,272 A | * | 6/1989 | Mabuchi ...................... | 310/239 |
| 6,169,348 B1 | * | 1/2001 | Won ............................. | 310/81 |
| 6,359,364 B1 | * | 3/2002 | Yamaguchi et al. ......... | 310/248 |
| 6,522,037 B2 | * | 2/2003 | Lee et al. ................. | 310/68 R |
| 6,713,911 B2 | * | 3/2004 | Yamaguchi .................. | 310/81 |
| 2002/0027395 A1 | * | 3/2002 | Tsurukawa et al. .......... | 310/237 |
| 2003/0015934 A1 | * | 1/2003 | Kobayashi et al. .......... | 310/242 |
| 2003/0048028 A1 | * | 3/2003 | Lee et al. ..................... | 310/248 |
| 2003/0155836 A1 | * | 8/2003 | Uda et al. .................... | 310/239 |
| 2003/0193262 A1 | * | 10/2003 | Koyanagi et al. ........... | 310/237 |

FOREIGN PATENT DOCUMENTS

| | | | | |
|---|---|---|---|---|
| JP | 52-149204 | | 12/1977 | |
| JP | 54121904 | * | 9/1979 | .......... H02K/13/00 |
| JP | 57-163179 | | 10/1982 | |
| JP | 61-035135 | | 2/1986 | |
| JP | 62-131741 | | 6/1987 | |
| JP | 02-223356 | | 9/1990 | |
| JP | 08223870 | * | 8/1996 | .......... H02K/13/00 |
| JP | 10052004 | * | 2/1998 | .......... H02K/13/00 |
| JP | 10-322996 | | 12/1998 | |
| JP | 11150919 | * | 6/1999 | .......... H02K/13/00 |
| JP | 11-150919 | | 6/1999 | |
| JP | 2001-145305 | | 5/2001 | |
| JP | 2001178083 | * | 6/2001 | .......... H02K/13/00 |
| JP | 2002204552 | * | 7/2002 | .......... H02K/13/00 |
| JP | 2002345213 | * | 11/2002 | .......... H02K/13/00 |

* cited by examiner

*Primary Examiner*—Darren Schuberg
*Assistant Examiner*—Heba Elkassabgi
(74) *Attorney, Agent, or Firm*—Robert E. Bushnell, Esq.

(57) ABSTRACT

An axial direction sliding-contact type brush apparatus is provided which can not only maintain performance of suppressing vibration of a brush of a flat vibrator motor but also allow the brush to form a stable electrical contact with a commutator. The base portion of the brush is installed at the exposed portion of the pattern of the brush base above the bracket at an elevation angle of 45° or less with respect to the brush base. The ultraviolet-cured acryl-based resin is coated on the base portion of the brush to cover a position located at about ⅓ of the side projection length L of the brush arm portion from the base portion of the brush.

31 Claims, 7 Drawing Sheets

FLAT OSCILLATION MOTOR EQUIPPED WITH A BRUSH APPARATUS

CLAIM OF PRIORITY

This application makes reference to, incorporates the same herein, and claims all benefits accruing under 35 U.S.C. §119 from my application entitled BRUSH CONTROL APPARATUS AND METHOD FOR MANUFACTURING THE BRUSH CONTROL APPARATUS, AND A FLAT OSCILLATION MOTOR EQUIPPED WITH THE BRUSH CONTROL APPARATUS filed with the Japanese Patent Office on Jul. 18, 2001 and there duly assigned Serial No. 2001-217553.

BACKGROUND OF THE INVENTION

1. Technical Field

The present invention relates to an improved design and method of manufacturing a vibration motor, and more particularly, to an axial direction sliding-contact type brush apparatus of a flat type motor using in a silent call means for a mobile communications apparatus where the integrity of the electrical contact between the rotating commutator and the brush is improved by a damping effect of a resin applied in liquid form and then cured to serve to dampen vibrations a brush experiences.

2. Related Art

Due to recent developments in mobile communications technologies, mobile apparatuses are continuously made smaller and lighter. A compact flat vibrator motor is widely used as a silent call means in mobile communications.

A small flat vibrator motor has a structure having a flat rotor having a flat commutator attached thereto, the motor further having a flat magnet, an axial direction sliding-contact type brush and a flat brush base that are stacked with respect to a shaft in a small, flat cylindrical housing. In the flat motor having the above structure, the rotor is eccentric, for example, the rotor itself is formed to be eccentric and/or one or a plurality of armature coils are disposed on the flat rotor eccentric about the shaft. Thus, when the rotor is rotated as electric power is supplied to the armature coil via the commutator from the brush an unbalanced centrifugal force is generated by the eccentricity of the rotor and/or armature coil(s) and the vibrations are transferred to the housing through the shaft.

However, in the above flat vibrator motor, since the vibration that is generated by the rotation of the eccentric rotor is also transferred to the brush, the integrity of the electrical connection between the brush and the commutator is poor, resulting in the generation of sparks at a contact portion between the brush and the commutator due to the vibration of the motor. Furthermore, as the brush itself loses elasticity with age, the contact pressure of the brush with respect to the commutator decreases further hindering the integrity of the electrical connection between the commutator and the brush. In extreme cases, the motor stops and does not work at all.

Attempts to absorb the vibration transferred to the brush include attaching a damping member at a brush arm portion of the brush. However, in the case of a small and flat vibrator motor having the above structure, because the sizes of the motor and the brush are small, there is insufficient space to attach the damping member, making the attachment process very difficult. In particular, when a damping member is employed in a motor generating a strong vibration such as in a vibrator motor, since the damping member needs to be large in size and installed with a degree of accuracy, the installation process can become very complicated and expensive.

SUMMARY OF THE INVENTION

It is therefore an object of the present invention to provide an improved design for a miniature vibration motor and an improved design for the brush apparatus used in the miniature vibration motor where the integrity of the sliding electrical contact between the brush and the commutator is improved by suppressing the amount of vibration delivered to the brush.

It is also another object of the present invention to provide a practical method of manufacturing the above motor and brush apparatus.

To achieve the above objects, there is provided an axial direction sliding-contact brush apparatus having an axial direction sliding-contact type brush having a base portion attached to a bracket, the base being disposed between the bracket and the brush. A proximal end of the brush being electrically connected with the base having printed wiring. The distal or free end of the brush is in sliding contact with the commutator. The commutator being attached to a rotor base having one or more armature coils disposed thereto. The coils are electrically connected to the commutator. The rotor base and the armature coils are disposed eccentrically about a stationary shaft to produce vibration for the entire motor upon application of electricity. Power is applied to a contact on the printed wired base and the power is applied to the brushes and then the commutator and then the coils. The proximal end of the brushes are surrounded or encapsulated by the vibration suppression member to attenuate vibration relayed on to the brushes.

It is preferred in the present invention that the vibration suppression member is formed of resin that is cured by exposure to ultraviolet radiation. Upon applying the resin to the brush, the resin is in a liquid state to allow for easy application. After the resin is applied to the brush situated on a brush base, the resin is cured by exposure to ultraviolet radiation. After curing, the resin is solidified and serves to dampen vibrations generated by the rotation of an eccentric rotor so that the brush does not experience the full effect of the vibrations. Because the vibrations experienced by the brush are attenuated by the presence of the cured resin, the integrity and reliability of the electrical contact between the brush and the commutator is greatly improved during the operation of the motor.

The present invention contemplates that the ultraviolet-cured resin is ultraviolet-cured acryl-based resin or ultraviolet-cured silicon-based resin. Because the resin, when applied to the brush is in a liquid state, manufacture of the inventive motor becomes simple as the application of the liquid resin to the brush and curing the resin are simple processes.

In the present invention, one portion of the brush is attached to the base and is bent at a proximal end so that a remaining portion of the brush forms an angle α with the base of 45° or less. Furthermore, in the present invention, the portion of the brush having an angle with the base has a horizontal component $L_H$ parallel to the surface of the base of the brush. The portion of the brush that forms the first $⅓ L_H$ of the horizontal component of the brush (i.e., a portion of the brush near the proximal end) is encapsulated by resin. Furthermore, one embodiment further contemplates that this encapsulated portion of the brush is curved so that a greater portion of the brush is encapsulated by resin, thereby increasing the attenuation of the vibrations delivered to the brush. When the brush is curved, the angle between the brush and the base at the bend is greater than 45° so that the distal portion of the brush still forms an angle α with the base that is equal to or less than 45°.

To achieve another object of the present invention, there is provided a method of manufacturing an axial direction sliding-contact type brush apparatus by arranging a base portion of a brush at a flat brush base, coupling the flat brush base to a bracket, and coating a portion around the base portion of the brush with a predetermined flexible resin by using a nozzle of a flexible resin coating dispenser.

In detail, it is preferred in the present invention that the liquid resin, prior to curing, has a viscosity in the range of 3–20 Pascal-seconds. When the resin is cured by exposure to ultraviolet radiation, the resin solidifies into a flexible solid and serves to attenuate vibrations delivered to the brush.

To achieve yet another object of the present invention, there is provided a flat motor comprising a brush apparatus including an axial direction sliding-contact type brush having a base portion attached to a bracket. The proximal portion of brushes are electrically connected to the base. The base has printed wiring thereon. Electrical energy is applied to the base and then to the brushes, the commutator, and then the coils disposed on the rotor base to rotate the eccentric rotor base to vibrate the motor. A vibration suppression member is disposed on the base and on a proximal end of the brushes. A magnet arranged at the bracket to face the flat rotor to form an air gap between the magnet and the rotor bearing the armature coils. The vibration suppression member dampens or attenuates vibrations delivered to the brushes thereby improving the reliability and integrity of the electrical contact between the distal end of the brush with the rotating commutator. Thus, by doing so, vibration is generated which can be used as a silent call during rotation of the rotor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
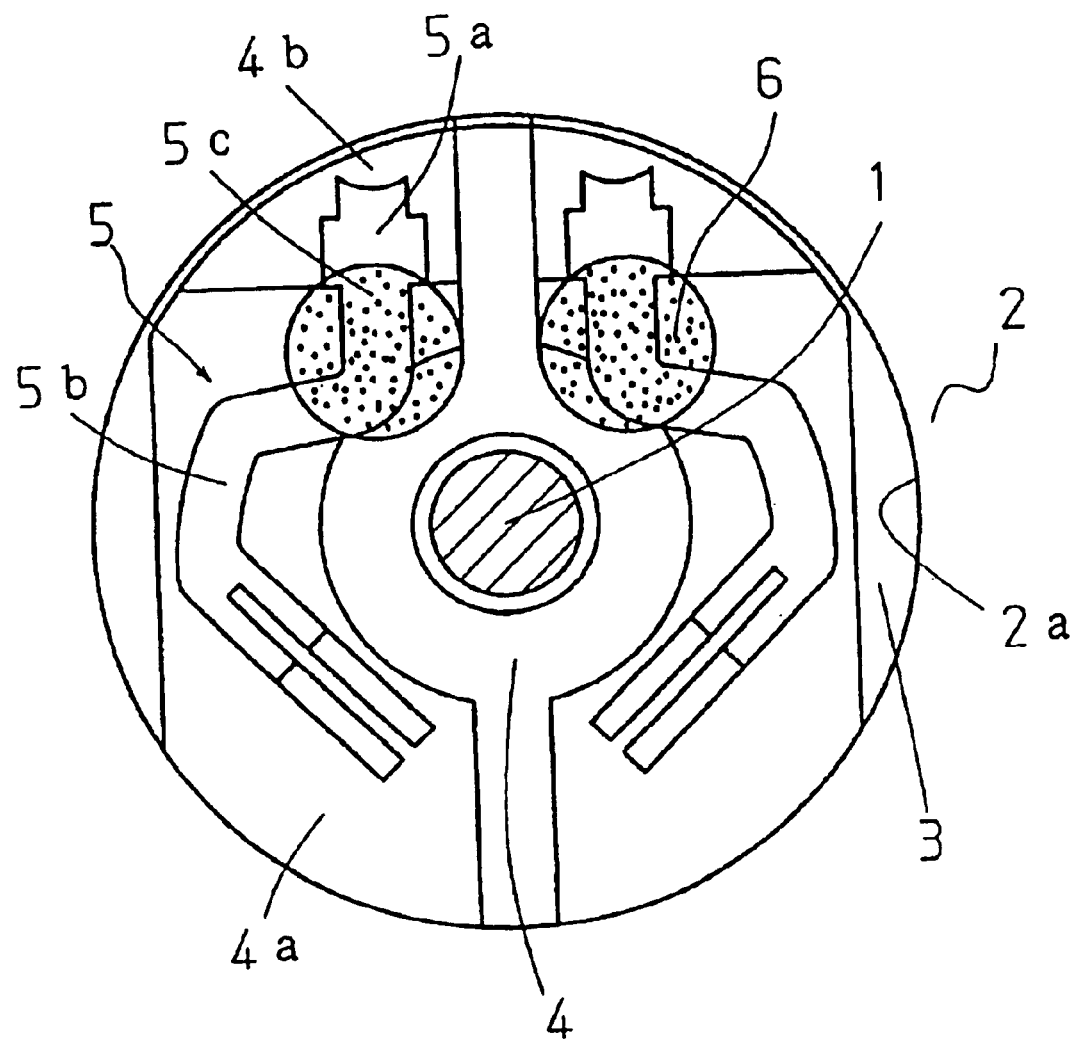
FIG. 1 is a plan view showing major parts of a motor adopting a brush apparatus according to the principles of the present invention.

Turning to FIG. 1, a shaft 1 of a motor is inserted into a hole portion 2a at the center of a ring type stator magnet 2 fixed coaxially with the shaft 1. A brush base 4 is inserted between the magnet 2 and a bracket 3, base 4 supports the magnet 2. The brush base 4 is attached to the bracket 3. A flat portion 5a of a brush 5 is fixed to an exposed portion 4b of a pattern portion 4a of the brush base 4 by soldering or welding to establish electrical contact between brush 5 and base 4. This patterned portioned 4a is preferably a printed circuit card. Base 4 is also called a flat brush base 4 or a brush base 4 or a flat base 4. FIG. 1 illustrates that a pair of brushes 5 are installed symmetrically about shaft 1. Each brush 5 has a brush arm 5b having a curved shape viewed from the top to increase an effective length of a spring in a small space.

Figure 2:
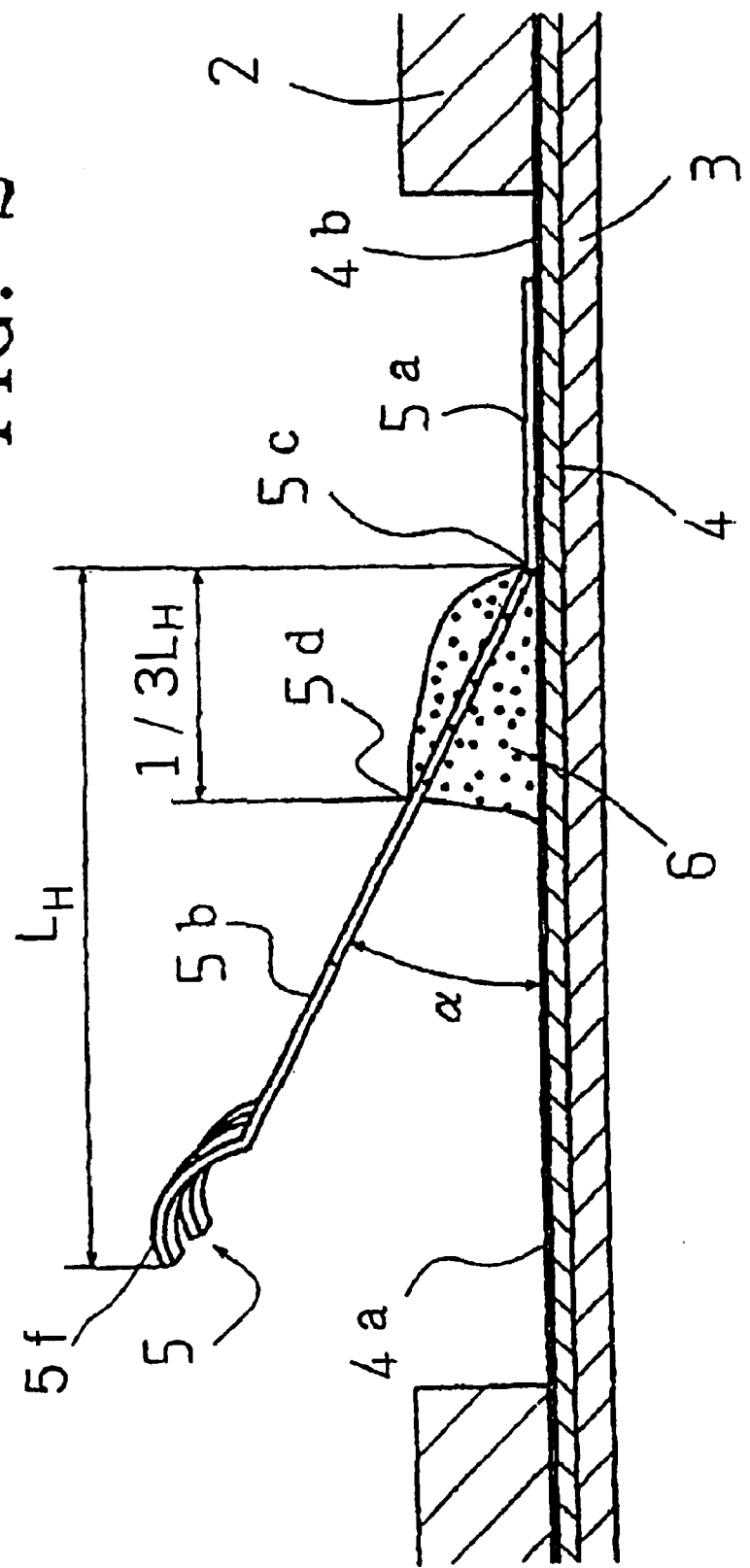
FIG. 2 is a sectional view showing the major parts of the brush apparatus illustrated in FIG. 1 according to a first embodiment of the present invention.

FIG. 2 illustrates a side view of FIG. 1 according to a first embodiment of the present invention. As illustrated in FIG. 2, ultraviolet-cured acryl-based resin 6 is coated on the brush base 4 at a portion between bend (or proximal end) 5c and point 5d. Reference numeral 5f indicates a distal portion of brush arm 5b that contacts commutator 8. The entire length of brush arm 5b has a horizontal component $L_H$ that is parallel to brush base 4 and bracket 3. It is to be appreciated that reference numeral 5d is a point on brush arm 5b where the portion of the brush arm between bend 5c and point 5d has a horizontal component of $\frac{1}{3}L_H$. Point 5d is also significant in that only the portion of brush arm 5b between bend 5c and point 5d is encapsulated by resin 6 which serves to dampen vibrations.

As illustrated in FIG. 2, the brush arm 5b of the brush 5 forms an angle α with respect to the brush base 4 and bracket 3. It is to be appreciated that angle α is 45° or less. The flat portion 5a of the brush 5 is fixed to the exposed portion 4b of the patterned portion 4a of the brush base 4. Resin 6 is coated to cover a portion of brush arm 5b between bend 5c and point 5d. Brush arm 5b has a horizontal component $L_H$ and the portion of brush arm 5b encapsulated resin 6 has a horizontal component $\frac{1}{3}L_H$.

Figure 3A:
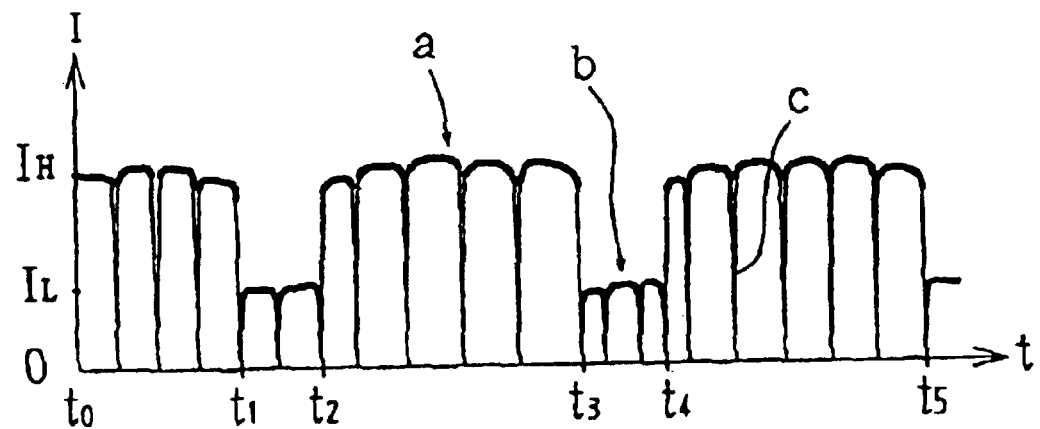
FIGS. 3A and 3B are waveforms of current versus time of current delivered to the commutator via the brush for an earlier eccentric motor and an eccentric rotor according to the principles of the present invention.
Figure 3B:
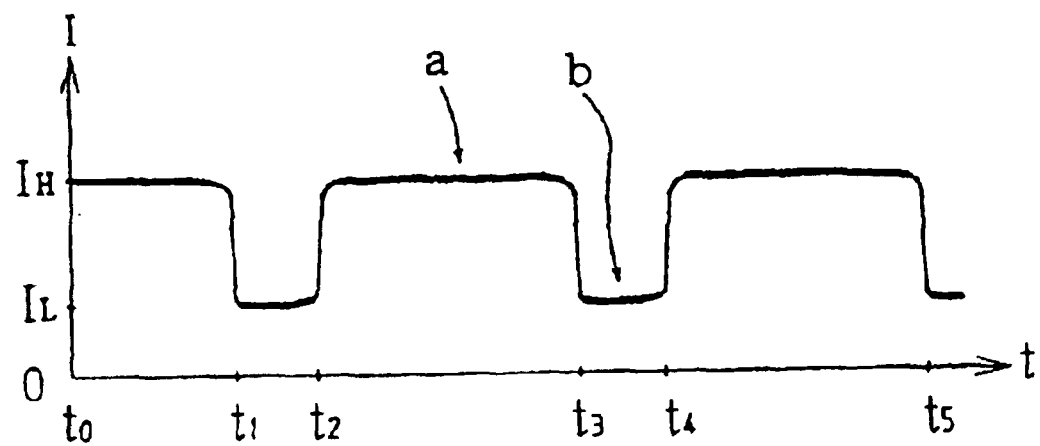

FIG. 3A illustrates a waveform of current of a flat vibrator motor which does not include a vibration suppression member of the present invention. FIG. 3B illustrates a waveform of current of a flat vibrator motor adopting a brush apparatus according to the present invention. The current waveform of each of FIGS. 3A and 3B are current waveforms of a flat vibrator motor in which the armature of a rotor has two coils. In the drawings, reference letter "a" denotes a waveform when current is applied to only one coil, and reference letter "b" denotes a waveform when current is applied to both of the two coils. Reference "c" denotes a current flow state in which contact between the brush and the commutator is not stable.

As can be seen from FIGS. 3A and 3B, in the current waveform of a flat vibrator motor having a structure that does not include the vibration suppression member, the waveform "c" illustrates that the faulty electrical connection is very sizable in a motor not having a vibration attenuator, as illustrated by the curve in FIG. 3A. However, in the current waveform of a flat vibrator motor having the brush vibration suppression member according to the present invention, the portions of waveform "c" illustrating a poor electrical connection state is absent in the waveform of FIG. 3B. This means that the integrity and reliability of the electrical contact between the brush 5 and the commutator 8 is improved when the resin 6 is employed to attenuate vibrations delivered to the brush 5. The vibration transferred to the brush 5 from the rotor or housing is suppressed by shearing deformation and compression deformation of the ultraviolet-cured acryl-based resin coated as above, so that the electrical contact between the brush 5 and the commutator 8 is solidly maintained during operation of the motor. According to tests, the best mode is to coat the portion of brush arm 5b between bend 5c and point 5d in addition to the portion of brush base 4 underneath the coated portion of brush arm 5b with an ultraviolet-cured acryl-based resin so that a length of $\frac{1}{3}L_H$ of brush base 4 is covered by resin 6.

Figure 4:
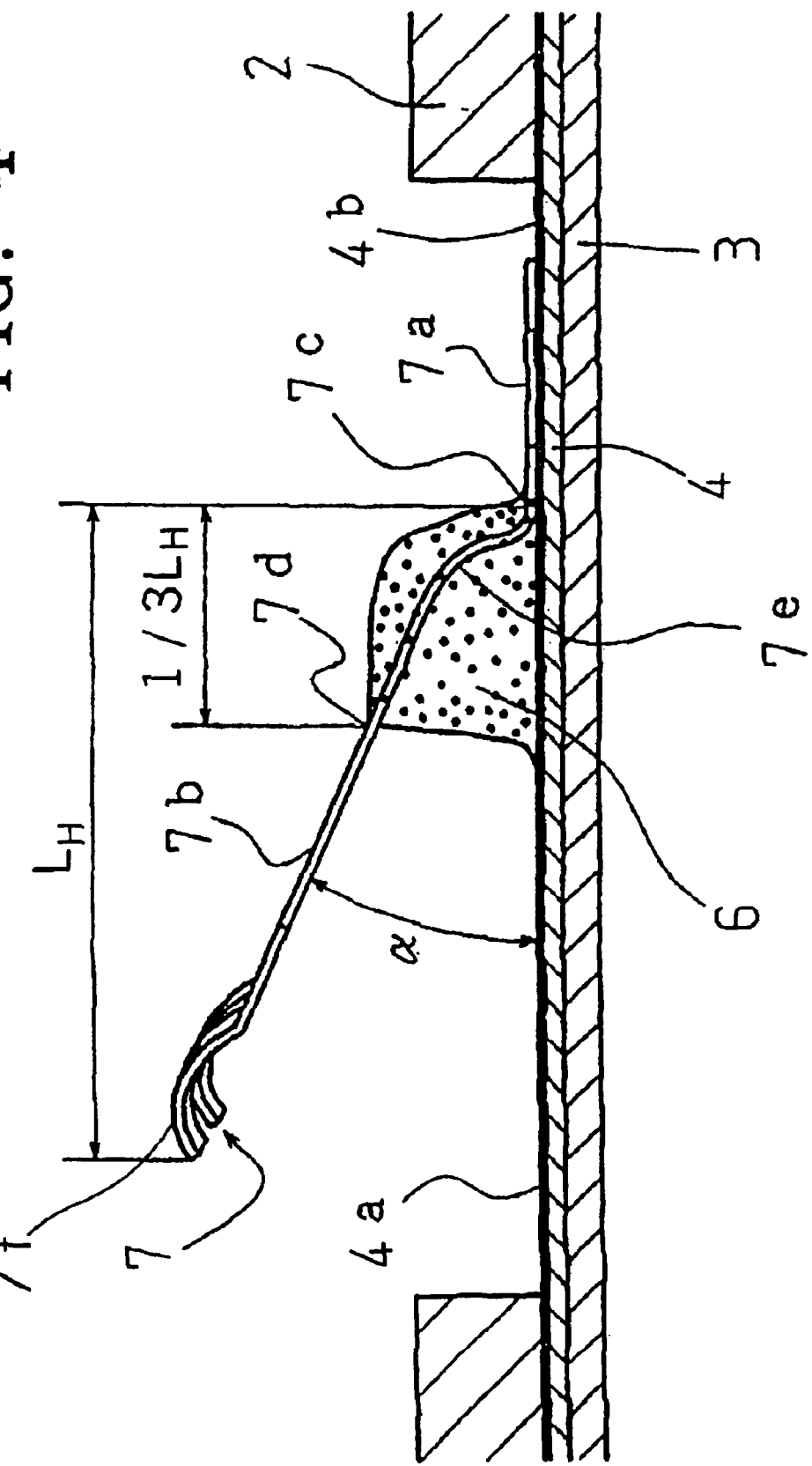
FIG. 4 is a sectional view showing major parts of a brush apparatus according to a second embodiment of the present invention.

FIG. 4 illustrates a side view of a brush apparatus according to a second embodiment of the present invention. A brush arm 7b forms an elevation angle α with respect to the brush base 4 attached to the bracket 3. A flat portion 7a of brush 7 is fixed to the exposed portion 4b of the patterned portion 4a of the brush base 4. Reference numeral 7c denotes a bent portion of brush 7. The portion of brush arm 7b between bent portion 7c and point 7d is encapsulated by resin 6. This encapsulated region of brush arm 7b includes a curved portion 7e. The distal portion of brush arm 7b forms an angle α with base 4 and bracket 3. Brush arm 7b has a horizontal component $L_H$ parallel to surface of base 4 and bracket 3. As in the first embodiment, a portion of arm 7b adjacent to bent portion 7c that has a horizontal component of $\frac{1}{3}L_H$ is covered by resin. However, because curved portion 7e is encapsulated by resin, a greater portion of arm 7b is encapsulated by resin, further improving the attenuating effects on vibrations the resin imparts to brush 7.

Figure 5A:
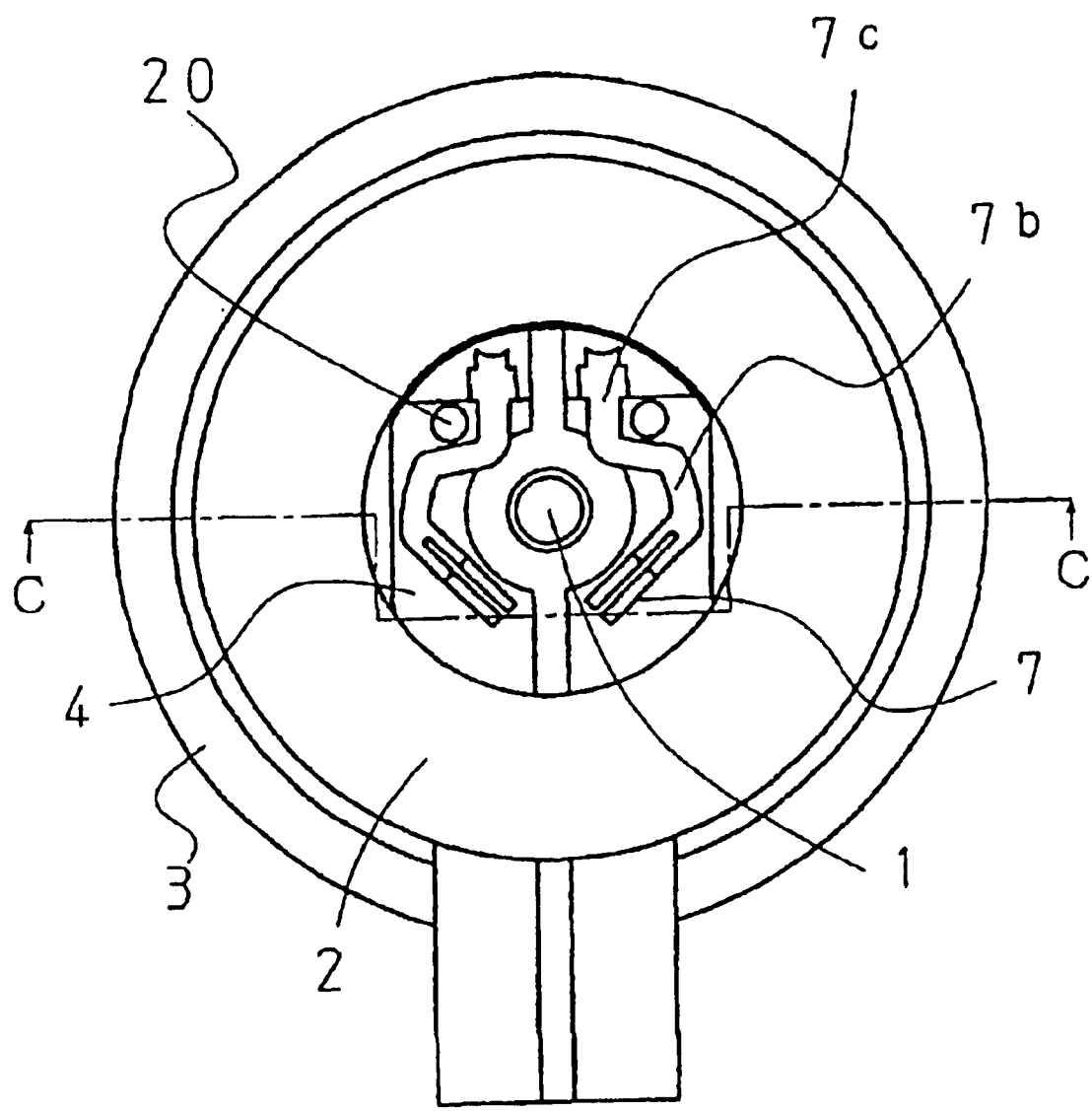
FIGS. 5A and 5B are views for illustrating a method of manufacturing a brush apparatus according to the principles of the present invention.
Figure 5B:
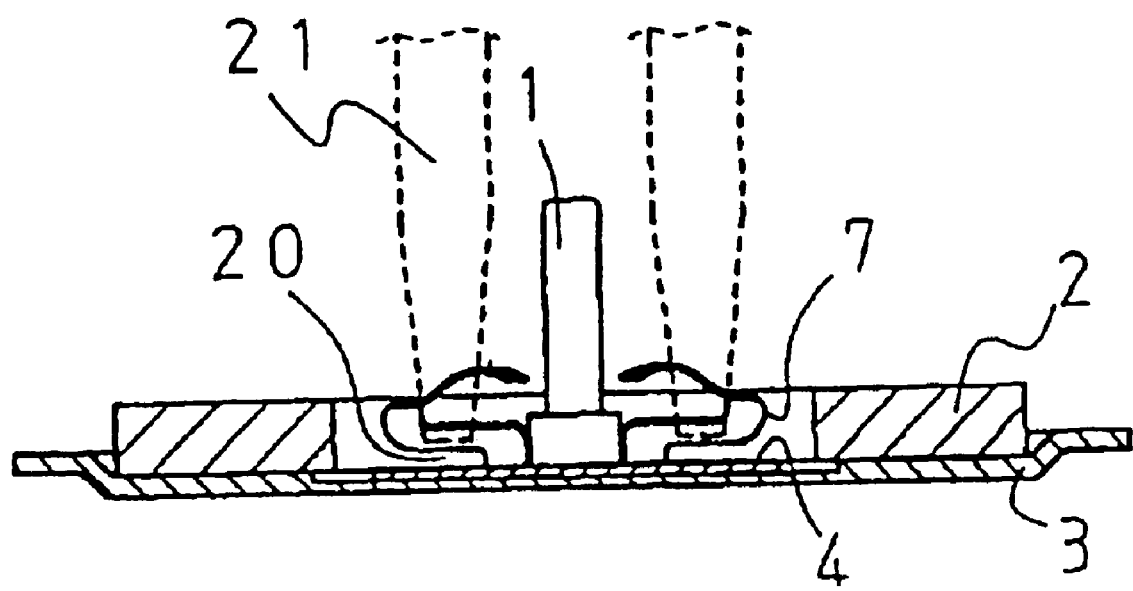

Referring to FIGS. 5A and 5B, a method of manufacturing a brush apparatus according to a preferred embodiment of the present invention is described below. The bent portion 7c of the brush 7 is fixed to the brush base 4 by soldering or spot welding. The brush base 4 is attached to bracket 3 and bracket 3 is attached to and disposed about shaft 1. A stator magnet 2 is fixed at the surface of the bracket 3 using an adhesive. Magnet 2 is also disposed about shaft 1.

process of applying resin 6 to portions of brush 7 and base 4 are described in conjunction with FIG. 5B. Nozzle 21 dispenses liquid resin 6 having a viscosity of 3–20 Pascal-seconds to access portion 20 between bent portion 7c and point 7d of arm 7b of brush 7. Resin 6 is either acryl-based or silicon-based. Resin 6 is later cured by exposing resin 6 to ultraviolet radiation. Upon curing resin 6, resin 6 is a flexible material that dampens or attenuates vibrations generated by the eccentric rotor and delivered to brush arm 7b. Since the inside of the housing of the flat vibrator motor has a structure to block all external light, the ultraviolet-cured resin is not cured again after the motor is assembled.

Figure 6:
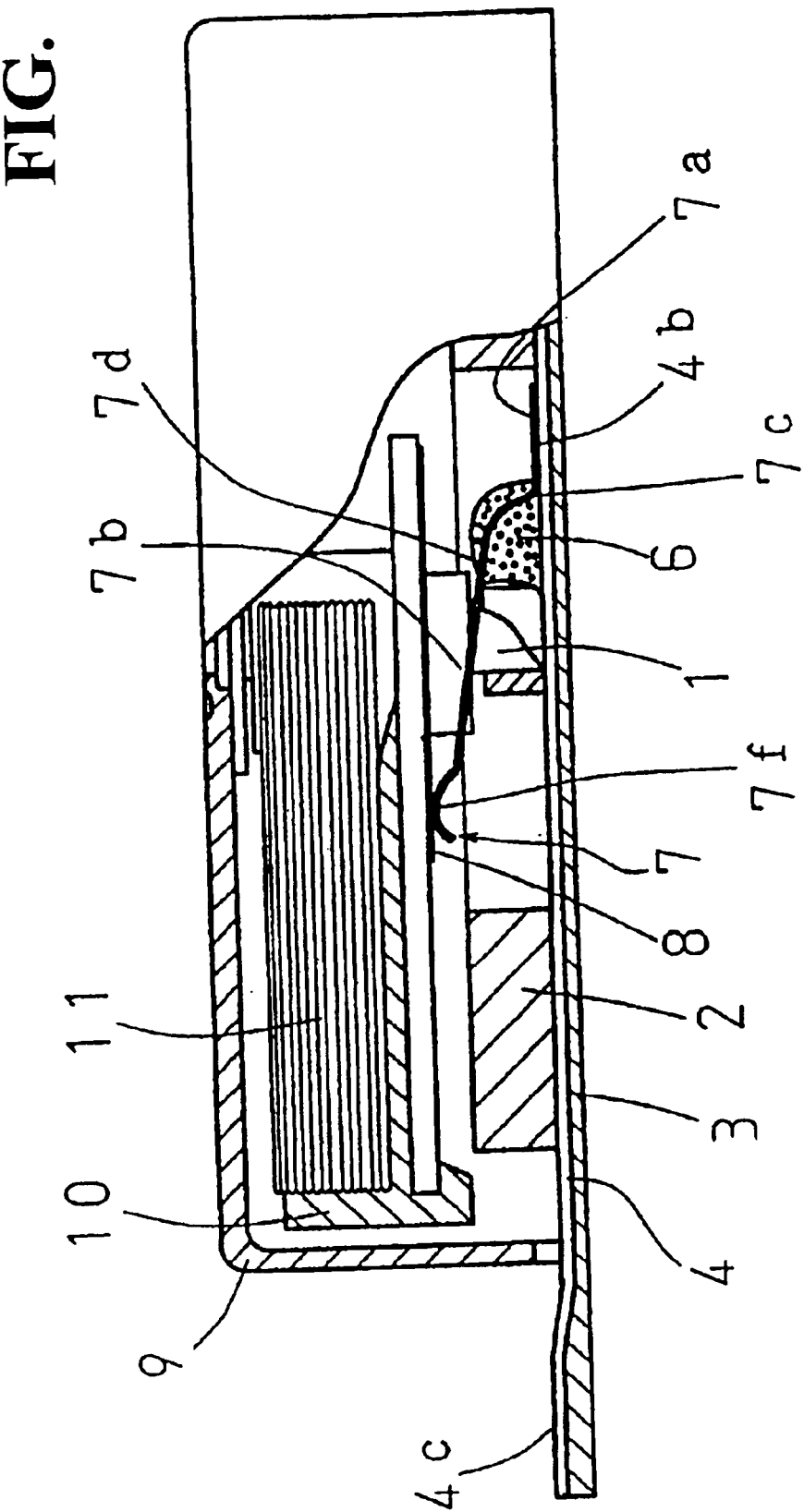
FIG. 6 is a partially cut-away sectional view illustrating a flat vibrator motor having a brush apparatus according to the second embodiment of the present invention.

FIG. 6 illustrates a side view of a complete assembly of a vibration motor according to the second embodiment of the present invention. Referring to FIG. 6, the bracket 3 to which the shaft 1, the magnet 2, and the brush base 4 are fixed is coupled to a case 9. The brush base 4 is attached approximately to a center of bracket 3. Brush base 4 includes electric power supply terminal 4c.

A proximal end of brush 7 is attached to the brush base 4 by solder and a distal end (sliding-contact portion 7f) of the brush 7 forms a sliding electrical contact with commutator 8. The commutator 8 is fixed to a rotor base 10 where armature coils 11 are arranged to be eccentric about shaft 1. Commutator 8 is in electrical contact with the armature coils 11. The resin 6 is applied to the brush base 4 so as to cover a portion of brush arm 7b between bent portion 7c and point 7d. The horizontal distance (the distance parallel to surface of base 4) from position 7d to bent portion 7c on brush arm 7b is ⅓ of the horizontal distance from distal portion 7f to proximal or bent portion 7c.

In the motor having the above structure, when DC power is applied to the motor electric power supply terminal 4c, the eccentric rotor is rotated and vibration is generated due to the rotation of the eccentric rotor. The vibration generated by the eccentric rotor is transferred to the outside of the motor as well as to the brush, inhibiting a stable contact of high integrity. By applying and curing the resin 6, the amount of vibration transferred to brush 7 is attenuated or dampened so that brush 7 can form a stable and reliable electrical contact with commutator during the operation of the motor.

As described above, by arranging the vibration suppression member (resin 6) at the brush, a brush apparatus having a superior vibration suppression function can be provided. The vibration suppression member arranged at the brush can be provided by coating ultraviolet-cured acryl-based resin having an viscosity prior to curing within a range of 3–20 Pascal-seconds. Upon application of ultraviolet radiation, the resin 6 is cured to form a flexible solid material that damps or attenuates vibrations of a frequency generated by the motor.

Also, the angle α (elevation angle) between brush arm 7b and the flat brush base 4 is set to be less than or equal to 45°. The cured resin 6 encapsulates a portion of brush arm 7b from bend 7c to a point 7d where the horizontal component of 7c to 7d is one-third of the horizontal component of bend 7c to contact portion 7f. Thus, vibration of the brush can be prevented. Further attenuation can be achieved by curving a portion 7e of brush arm 7b between bend 7c and point 7d and having this portion encapsulated by cured resin. In the above description, although ultraviolet-cured acryl-based resin is discussed as a damping mechanism, it is to be appreciated that ultraviolet-cured silicon-based resin can also be used in this invention to dampen vibrations to the brush.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A motor, comprising:
   a bracket;
   a flat base attached to an upper surface of the bracket;
   a brush comprising a flat portion arranged to be parallel to the base and electrically and mechanically attached to an upper surface of the base, and a brush arm extending from the flat portion and forming an acute angle with said base, said brush arm having a distal free end in sliding electrical contact with a flat commutator and a proximal end opposite said distal free end, the proximal end of the brush arm being adjacent to said flat portion of said brush; and
   a vibration suppression member formed of flexible resin and arranged on the upper surface of the base, the resin surrounding a portion of said brush arm adjacent to the proximal end.

2. The motor of claim 1, the resin comprising a material selected from the group consisting of acryl-based resin and silicon-based resin.

3. The motor of claim 2, said flat portion of said brush being attached to said base by solder.

4. The motor of claim 2, further comprising:
   a flat rotor to which the commutator is coupled;
   a magnet arranged at the bracket to face the flat rotor with a gap in an axial direction between said rotor and said magnet; and
   a case housing the brush, the flat rotor and the magnet.

5. The motor of claim 1, one-third of a length said brush arm being surrounded by said resin, said one-third of said length of said brush arm being adjacent to said proximal end of said brush arm and not being adjacent to said distal end of said brush arm.

6. The motor of claim 5, further comprising:
a flat rotor to which the commutator is coupled;
a magnet arranged at the bracket to face the flat rotor with a gap in an axial direction between said rotor and said magnet; and
a case housing the brush, the flat rotor and the magnet.

7. The motor of claim 1, said portion of said brush arm surrounded by said resin being curved.

8. The motor of claim 7, the curve in the brush arm not being a sharp bend but a gentle curve covering a significant portion of a length of the brush arm.

9. The motor of claim 1, further comprising:
a flat rotor to which the commutator is coupled;
a magnet arranged at the bracket to face the flat rotor with a gap in an axial direction between said rotor and said magnet; and
a case housing the brush, the flat rotor and the magnet.

10. The motor of claim 9, said base having an electrically conductive pattern thereon, said brush being electrically connected to said electrically conductive pattern on said base.

11. The motor of claim 1, said base having an electrically conductive pattern thereon, said brush being electrically connected to said electrically conductive pattern on said base.

12. The motor of claim 1, said resin completely surrounding said portion of said brush arm adjacent to said proximal end of said brush arm.

13. The motor of claim 1, said brush arm being straight and one-third of a length of said brush arm being encapsulated by said resin.

14. The motor of claim 1, wherein said portion of said brush arm adjacent to said proximal end is curved, said curved portion of said brush arm being encapsulated by said resin, a remaining portion of said brush arm is straight and is not encapsulated by said resin.

15. A motor, comprising:
a bracket;
a flat base attached to an upper surface of said bracket;
a brush having a flat portion arranged to be parallel to the base and electrically and mechanically attached to an upper surface of the base, and a brush arm extending from the flat portion and forming an acute angle with said base, a distal end of said brush arm forming sliding electrical contact to a commutator;
a vibration damping member formed of flexible resin and arranged on a portion of said brush arm adjacent to a proximal end of said brush arm, said proximal end of said brush arm being opposite from said distal end of said brush arm, said proximal end of said brush arm being an end of said brush arm that is adjacent to said flat base, said vibration damping member being also arranged on said flat base underneath said portion of said brush arm adjacent to said flat base;
a flat rotor to which the commutator is coupled;
a magnet arranged at the bracket to face the flat rotor with a gap in an axial direction between said rotor and said magnet; and
a case housing the brush, the flat rotor and the magnet.

16. The motor of claim 15, the resin comprising a material selected from the group consisting of acryl-based resin and silicon-based resin.

17. The motor of claim 15, the flat portion of said brush being attached to the base by solder.

18. The motor of claim 15, said portion of said brush arm adjacent to said proximal end being curved, said resin surrounding said curved portion of said brush arm.

19. The motor of claim 18, the curve in the brush arm not being a sharp bend but a gentle curve covering a significant portion of a length of the brush arm, said resin surrounding said curve in said brush arm.

20. The motor of claim 15, wherein one-third of a length of said brush arm is surrounded by said resin.

21. The motor of claim 20, the rotor being eccentric about a shaft, said rotor having an armature coil arranged thereon, said armature coil being electrically connected to said commutator.

22. The motor of claim 15, the rotor being eccentric about a shaft, said rotor having an armature coil arranged thereon, said armature coil being electrically connected to said commutator.

23. The motor of claim 15, the rotor being eccentric about a shaft, said rotor having an armature coil arranged thereon, said armature coil being electrically connected to said commutator.

24. The motor of claim 15, said motor being formed by a process comprising:
electrically attaching the brush to the base;
attaching said base to said bracket; and
depositing said resin using a nozzle of a resin coating dispenser to cover the portion of said brush arm adjacent to said proximal end of said brush arm, said resin also covering a portion of said base underneath said portion of said brush arm, said resin being applied in a liquid state and being cured into a solid upon exposure to ultraviolet radiation.

25. The motor of claim 15, said brush being an axial direction sliding-contact type brush.

26. The motor of claim 15, said brush arm being straight and one-third of a length of said brush arm being encapsulated by said resin.

27. The motor of claim 15, wherein said portion of said brush arm adjacent to said proximal end is curved, said curved portion of said brush arm being encapsulated by said resin, a remaining portion of said brush arm is straight and is not encapsulated by said resin.

28. A method of manufacturing a vibration-type motor having an axial direction sliding-contact type brush, said method comprising:
electrically attaching the brush to a base, said brush having a portion that forms an angle with said base, said portion that forms an angle having a proximal end that is bent and attached to said base and a distal end that forms said sliding contact with a commutator, and extending a brush arm to form an acute angle with said base, said brush arm having a distal free end in sliding electrical contact with a flat commutator and a proximal end opposite said distal free end, the proximal end of the brush arm being adjacent to said flat portion of said brush; and extending a brush arm to form an acute angle with said base, said brush arm having a distal free end in sliding electrical contact with a flat commutator and a promixal end opposite said distal free end, the promixal end of the brush arm being adjacent to said flat portion of said brush;
attaching said base to a bracket; and
depositing resin using a nozzle of a resin coating dispenser to cover a portion of said brush that forms an angle with said base near said proximal end of said brush, said resin also covering a portion of said base underneath said portion of said brush.

29. The method of claim 28, curing the resin by exposure to ultraviolet radiation after said depositing step.

30. The method of claim 29, comprised of electrically attaching a brush to a base by soldering said brush to said base, said base having printed wired circuitry thereon.

31. The method of claim 30, said method of forming said vibration motor comprising:

said brush being an axial direction sliding-contact type brush having a proximal portion attached to said base that is attached to said bracket, the base being disposed between said brush and said bracket, said brush having a distal free end in sliding electrical contact with the commutator; and a vibration suppression member being said resin arranged at the proximal portion of the brush and formed of flexible resin.

* * * * *